United States Patent
Luo et al.

(10) Patent No.: US 11,036,272 B2
(45) Date of Patent: Jun. 15, 2021

(54) METHOD AND APPARATUS FOR ADJUSTING DISPLAY INTERFACE OF SCREEN, USER INTERFACE, ELECTRONIC DEVICE, AND STORAGE MEDIUM

(71) Applicant: HUAWEI TECHNOLOGIES CO., LTD., Guangdong (CN)

(72) Inventors: Honglei Luo, Shanghai (CN); Yuhua Guo, Shanghai (CN); Chunlang Pu, Shanghai (CN); Kangjie Chao, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 149 days.

(21) Appl. No.: 16/065,332

(22) PCT Filed: Dec. 23, 2015

(86) PCT No.: PCT/CN2015/098498
§ 371 (c)(1),
(2) Date: Jun. 22, 2018

(87) PCT Pub. No.: WO2017/107112
PCT Pub. Date: Jun. 29, 2017

(65) Prior Publication Data
US 2018/0373310 A1 Dec. 27, 2018

(51) Int. Cl.
*G06F 1/3218* (2019.01)
*G09G 5/10* (2006.01)
(Continued)

(52) U.S. Cl.
CPC .......... *G06F 1/3218* (2013.01); *G06F 1/3265* (2013.01); *G06F 3/147* (2013.01);
(Continued)

(58) Field of Classification Search
CPC .. G06F 1/3218; G06F 1/3265; G06F 11/3062; G09G 5/10; G09G 5/363; G09G 2320/0666; G09G 2330/021
See application file for complete search history.

(56) References Cited

U.S. PATENT DOCUMENTS 6,697,953 B1   2/2004 Collins
2008/0106531 A1*  5/2008 Hullot .............. H04M 1/72544
                                                        345/204
(Continued)

FOREIGN PATENT DOCUMENTS

CN   101593015       12/2009
CN   102098392 A     6/2011
(Continued)

OTHER PUBLICATIONS

International Search Report and Written Opinion issued in International Application No. PCT/CN2015/098498 dated Sep. 21, 2016, 13 pages.
(Continued)

*Primary Examiner* — Thomas J. Cleary
(74) *Attorney, Agent, or Firm* — Fish & Richardson P.C.

(57) ABSTRACT

The present disclosure relates to a method applied to an electronic device with a screen. The screen displays a display interface. In one example method, a current value of a current sampling point is obtained. Based on the current value, whether power consumption of the electronic device meets a criterion is determined. The display interface is adjusted when the power consumption of the electronic device does not meet the criterion.

6 Claims, 9 Drawing Sheets

(51) Int. Cl.
*G06F 3/147* (2006.01)
*G06F 11/30* (2006.01)
*G06F 1/3234* (2019.01)
*G09G 5/36* (2006.01)

(52) U.S. Cl.
CPC ........ *G06F 11/3062* (2013.01); *G09G 5/10* (2013.01); *G09G 5/363* (2013.01); *G09G 2320/0666* (2013.01); *G09G 2330/021* (2013.01)

(56) References Cited

U.S. PATENT DOCUMENTS

| | | | | |
|---|---|---|---|---|
| 2011/0316844 | A1* | 12/2011 | Alberth | G06F 1/3218 345/214 |
| 2013/0311803 | A1 | 11/2013 | Wang et al. | |
| 2014/0189583 | A1* | 7/2014 | Yang | G06F 1/3234 715/800 |
| 2014/0210833 | A1* | 7/2014 | Midorikawa | G09G 5/363 345/522 |
| 2015/0026487 | A1 | 1/2015 | Choi et al. | |
| 2015/0100813 | A1* | 4/2015 | Han | G09G 5/02 713/340 |
| 2015/0301578 | A1* | 10/2015 | Seo | G06F 1/3206 713/320 |
| 2016/0252944 | A1* | 9/2016 | Kim | G06F 1/28 713/340 |
| 2017/0235357 | A1* | 8/2017 | Leung | G06F 1/3212 713/310 |

FOREIGN PATENT DOCUMENTS

| | | |
|---|---|---|
| CN | 102156535 | 8/2011 |
| CN | 102946479 | 2/2013 |
| CN | 102981596 | 3/2013 |
| CN | 104184884 | 12/2014 |
| CN | 10469222 A | 6/2015 |
| CN | 104699221 A | 6/2015 |
| CN | 105096909 A | 11/2015 |
| KR | 101193893 B1 | 10/2012 |
| TW | I289398 | 11/2017 |

OTHER PUBLICATIONS

Office Action issued in Chinese Application No. 201580059326.4 dated Oct. 29, 2019, 6 pages (with English translation).
Office Action issued in Chinese Application No. 201580059326.4 dated Apr. 24, 2019, 25 pages (with English translation.

* cited by examiner

METHOD AND APPARATUS FOR ADJUSTING DISPLAY INTERFACE OF SCREEN, USER INTERFACE, ELECTRONIC DEVICE, AND STORAGE MEDIUM

CROSS-REFERENCE TO RELATED APPLICATIONS

This application is a National Stage of International Application No. PCT/CN2015/098498, filed on Dec. 23, 2015, which is hereby incorporated by reference in its entirety.

TECHNICAL FIELD

The present disclosure relates to the electronics field, and in particular, to a method and apparatus for adjusting a display interface of a screen, a user interface, an electronic device, and a storage medium.

BACKGROUND

With users' preference for large-screen electronic products, screens of electronic products become increasingly large, and accordingly, more energy (that is, power) is consumed by the screens. Consequently, standby capabilities of the electronic products are deteriorated.

Energy consumed by a screen is mainly used for maintaining displaying of the screen. Currently, a common method for controlling power consumption of a screen of an electronic device is using a luminance control bar on an interface of the electronic device to adjust luminance of the screen of the electronic device, so as to reduce the power consumption of the screen, and improve an overall standby capability of the electronic device.

However, in the method for reducing the power consumption of the screen, luminance of a display interface of the electronic device is reduced when the luminance of the screen is reduced. Consequently, a lightness of the display interface is reduced, a displaying effect is affected, and user experience is deteriorated.

SUMMARY

Embodiments of the present disclosure provide a method and apparatus for adjusting a display interface of a screen, a user interface, an electronic device, and a storage medium, so as to adjust power consumption of an electronic device by adjusting a display interface of a screen, thereby improving user experience.

To achieve the foregoing objective, the following technical solutions are used in the embodiments of the present disclosure:

According to a first aspect, a method for adjusting a display interface of a screen is provided, including:

obtaining a current value of a current sampling point;

determining, according to the current value, whether power consumption of the electronic device meets a criterion; and adjusting the display interface when determining that the power consumption of the electronic device does not meet the criterion.

The current sampling point is located in a power supply topology structure of an electronic device that includes the screen, and a current detector may be disposed at a location of the sampling point, so as to obtain a current at the sampling point. The current at the current sampling point can directly or indirectly reflect power consumption of the screen.

It should be noted that a specific location of the sampling point in the power supply topology structure may be disposed according to an actual requirement, and is not specifically limited in the present disclosure. Preferably, the current at the location of the current sampling point can reflect the power consumption of the screen of the electronic device.

Preferably, the solutions of the present disclosure may be implemented by using an application (APP). The APP that implements the solutions of the present disclosure is installed in the electronic device, and when a user of the electronic device runs the APP, the solutions of the present disclosure start to be executed.

Preferably, the screen may be a screen whose power consumption varies with a color of a displayed display interface, such as an active-matrix organic light emitting diode (Active-Matrix Organic Light Emitting Diode, AMOLED for short) screen, or a passive-matrix organic light emitting diode (Passive-Matrix Organic Light Emitting Diode, PMOLED) screen.

With reference to the first aspect, in a first possible implementation of the first aspect, the determining, according to the current value, whether power consumption of the electronic device meets a criterion includes:

obtaining a power consumption evaluation result corresponding to the current value;

displaying the power consumption evaluation result on the screen; and if an indication entered by a user for indicating that the power consumption evaluation result is satisfactory is received within preset duration, determining that the power consumption of the electronic device meets the criterion; or if an indication entered by a user for indicating that the power consumption evaluation result is satisfactory is not received within the preset duration, or if an indication entered by a user for indicating that the power consumption evaluation result is unsatisfactory is received within the preset duration, determining that the power consumption of the electronic device does not meet the criterion.

The power consumption evaluation result corresponding to the current value may be a power consumption evaluation result corresponding to the current value itself, or may be a power consumption evaluation result corresponding to a power consumption value that is calculated according to the current value, or may be a power consumption evaluation result corresponding to the current value and the power consumption value. This is not specifically limited in the embodiments of the present disclosure.

Specifically, the power consumption evaluation result corresponding to the current value may be obtained from a preset correspondence. The preset correspondence includes at least one preset current value and/or power consumption value interval and a power consumption evaluation result corresponding to the current value and/or power consumption value interval.

In the first possible implementation of the first aspect, the user determines whether the power consumption of the electronic device meets the criterion. In the solutions of the present disclosure, the current value of the sampling point is obtained through sampling, and the power consumption evaluation result corresponding to the current value is output. Whether the power consumption of the electronic device meets the criterion is determined by using the indication of the user, so that the user can make an appropriate selection between the display interface and the power consumption according to an actual requirement. In this way, operability of the electronic device is improved, thereby improving user experience.

Displaying the power consumption evaluation result on the screen may be implemented by using a human-computer interaction interface of the electronic device; likewise, receiving the instruction entered by the user may also be implemented by using the human-computer interaction interface of the electronic device. Certainly, interaction with the user may also be implemented by using another externally-disposed input/output apparatus. This is not specifically limited in the present disclosure.

Optionally, the human-computer interaction interface of the electronic device may be a touch panel, a voice input or visual input system, or the like of the electronic device.

The power consumption evaluation result may be one or more items of the following information: a power consumption level, a power consumption score, a standby time corresponding to the power consumption, or the like. Certainly, the power consumption evaluation result may also be other content, and this is not limited in the embodiments of the present disclosure. Any information that can be used for quantizing the power consumption may be used as the content of the power consumption evaluation result.

With reference to the first aspect, in a second possible implementation of the first aspect, the determining, according to the current value, whether power consumption of the electronic device meets a criterion includes:

determining a relationship between the current value and a first preset threshold; and if the current value is greater than or equal to the first preset threshold, determining that the power consumption of the electronic device does not meet the criterion; or if the current value is less than the first preset threshold, determining that the power consumption of the electronic device meets the criterion.

When determining the relationship between the current value and the first preset threshold, a value relationship between the current value and the first preset threshold may be directly determined, or a value relationship between the power consumption value that is calculated by using the current value and the first preset threshold may be determined.

The second possible implementation of the first aspect is a solution parallel with the first possible implementation of the first aspect. In this solution, whether the power consumption of the electronic device meets the criterion is determined by an apparatus that executes the solutions of the present disclosure. The apparatus that executes the solutions of the present disclosure compares the current value of the sampling point with the first preset threshold, and automatically determines whether the power consumption of the electronic device meets the criterion, that is, automatically makes an appropriate selection between the display interface and the power consumption of the electronic device. This implements automatic adjustment on the display interface of the screen, and power consumption adjustment of the apparatus, thereby improving user experience.

With reference to the first aspect, in a third possible implementation of the first aspect, the determining, according to the current value, whether power consumption of the electronic device meets a criterion includes:

obtaining, from a preset correspondence, a power consumption evaluation result corresponding to the current value;

if the power consumption evaluation result is greater than or equal to a second preset threshold, determining that the power consumption of the electronic device meets the criterion: or if the power consumption evaluation result is less than the second preset threshold, determining that the power consumption of the electronic device does not meet the criterion.

The third possible implementation of the first aspect is a solution parallel with the first possible implementation of the first aspect and the second possible implementation of the first aspect. In this solution, whether the power consumption of the electronic device meets the criterion is also determined by the apparatus that executes the solutions of the present disclosure. Specifically, the apparatus that executes the solutions of the present disclosure compares the power consumption evaluation result with the second preset threshold, and automatically determines whether the power consumption of the electronic device meets the criterion, that is, automatically makes an appropriate selection between the display interface and the power consumption of the electronic device. This implements automatic adjustment on the display interface of the screen, and power consumption adjustment of the electronic device, thereby improving user experience.

With reference to any one of the first aspect, or the first possible implementation of the first aspect to the third possible implementation of the first aspect, in a fourth possible implementation of the first aspect, the adjusting the display interface includes: adjusting a color of the display interface.

With reference to any one of the first aspect, or the first possible implementation of the first aspect to the third possible implementation of the first aspect, in a fifth possible implementation of the first aspect, the adjusting the display interface includes:

if the display interface is a first wallpaper, adjusting the display interface to a second wallpaper, where the second wallpaper is any wallpaper that is in a preset wallpaper library and whose power consumption is less than that of the first wallpaper, or the second wallpaper is any wallpaper that is in the preset wallpaper library and that is different from the first wallpaper.

Further, the preset wallpaper library is a data set that includes at least one wallpaper and that is preset in the electronic device in which the screen is located. The wallpaper may be an image stored in the electronic device or a picture taken by using a camera of the electronic device.

Optionally, the adjusting the display interface includes: changing a color of a background of an image displayed on the display interface; or changing a color of text displayed on the display interface; or changing a color of an image displayed on the display interface.

The color of the image displayed on the display interface may be changed automatically, that is, the color of the image displayed on the display interface may be changed automatically with reference to ambient light luminance, so that the color of the displayed image ensures visual experience of human eyes.

Optionally, the color of the image displayed on the display interface may be changed manually by the user.

With reference to any one of the first aspect, or the first possible implementation of the first aspect to the third possible implementation of the first aspect, in a sixth possible implementation of the first aspect, the adjusting the display interface includes:

receiving an indication entered by the user for changing a color of a first region; and changing the color of the first region into a color indicated by the indication for changing the color of the first region, where the first region is any region on the display interface.

Optionally, the sixth possible implementation of the first aspect may be implemented on any display interface of the electronic device that includes the screen, and the solution may Be implemented by using a preset function of the electronic device.

For example, the preset function is referred to as a Do It Yourself (Do It Yourself, DIY for short) graffiti function.

The user may tap and hold the first region to start the DIY graffiti function and input the indication for changing the color of the first region. The user may tap to select a desired color in a color palette, so as to input the color indicated by the indication for changing the color of the first region.

Further, the color palette may be displayed to the user when the user inputs the indication for changing the color of the first region, so as to instruct the user to input the color indicated by the indication for changing the color of the first region.

Optionally, the method for adjusting a display interface of a screen in the present disclosure may be implemented by using a functional key, and the functional key that implements the solutions of the present disclosure may be set in the DIY graffiti function. When a color of a region is to be changed by using the DIY graffiti function of the electronic device, the power consumption adjustment key may be triggered by using the function, to start the solutions of the present disclosure.

Further, in any of the foregoing solutions, if the power consumption of the electronic device meets the criterion, a procedure ends.

According to a second aspect, a user interface of an electronic device is provided. The electronic device includes a display, a memory, a current detector, and a processor that is configured to execute an instruction stored in the memory. The user interface includes a display interface displayed in the first aspect or any possible implementation of the first aspect.

According to a third aspect, an apparatus for adjusting a display interface of a screen is provided, where the screen displays the display interface, and the apparatus includes a sampling unit, a determining unit, and an adjustment unit. The sampling unit is configured to obtain a current value of a current sampling point; the determining unit is configured to determine, according to the current value obtained by the sampling unit, whether power consumption of the apparatus meets a criterion; and the adjustment unit is configured to adjust the display interface when the determining unit determines that the power consumption of the apparatus does not meet the criterion. The apparatus adjusts the power consumption of the apparatus by adjusting the display interface, and this provides a new power consumption adjustment solution, Based on a same inventive concept, a problem-resolving principle of the apparatus is corresponding to the solution of the method design of the first aspect. Therefore, for implementation of the apparatus, refer to implementation of the method, and no repeated description is provided.

According to a fourth aspect, an apparatus for adjusting a display interface of a screen is provided, where the screen displays the display interface, and the apparatus includes a current detector and a processor. The current detector is configured to obtain a current value of a current sampling point; the processor is configured to determine, according to the current value obtained by the current detector, whether power consumption of the apparatus meets a criterion; and the processor is further configured to adjust the display interface when the power consumption of the apparatus does not meet the criterion. The apparatus adjusts the power consumption of the apparatus by adjusting the display interface, and this provides a new power consumption adjustment solution. Based on a same inventive concept, a problem-resolving principle of the apparatus is corresponding to the solution of the method design of the first aspect. Therefore, for implementation of the apparatus, refer to implementation of the method, and no repeated description is provided.

According to a fifth aspect, an electronic device with a screen is provided, where the screen displays a display interface, and the electronic device includes a current detector, a memory, and a processor. The current detector is configured to obtain a current value of a current sampling point; the memory is configured to store an instruction; and the processor invokes the instruction stored in the memory to: determine, according to the current value obtained by the current detector, whether power consumption of the electronic device meets a criterion; and adjust the display interface when determining that the power consumption of the electronic device does not meet the criterion. The electronic device adjusts the power consumption of the electronic device by adjusting the display interface, and this provides a new power consumption adjustment solution, eliminates a disadvantage in an existing solution in which power consumption is adjusted by adjusting luminance of a screen, and improves user experience. Based on a same inventive concept, a problem-resolving principle of the electronic device is corresponding to the solution of the method design of the first aspect. Therefore, for implementation of the electronic device, refer to implementation of the method, and no repeated description is provided.

According to a sixth aspect, a non-volatile computer readable storage medium for storing one or more programs is provided. The one or more programs include an instruction, and when being executed by an electronic device that includes a screen, the instruction enables the electronic device to execute the following event:

obtaining a current value of a current sampling point; determining, according to the current value, whether power consumption of the electronic device meets a criterion; and adjusting a display interface of the screen when the power consumption of the electronic device does not meet the criterion.

According to the method and apparatus for adjusting a display interface of a screen, the user interface, the electronic device, and the storage medium that are provided in the embodiments of the present disclosure, the current value of the current sampling point is obtained; whether the power consumption of the electronic device meets the criterion is determined according to the current value; and the display interface is adjusted when the power consumption of the electronic device does not meet the criterion. Light emitting materials of different pixels have different optical-to-electrical conversion efficiency. Therefore, according to the solutions of the present disclosure, when the power consumption does not meet the criterion, the power consumption of the electronic device can be adjusted by adjusting the display interface of the screen. The technical solutions of the present disclosure can be implemented without lowering a luminance level of the screen, or the technical solutions of the present disclosure can be implemented with a luminance level of the screen lowered.

DESCRIPTION OF EMBODIMENTS

Figure 1:
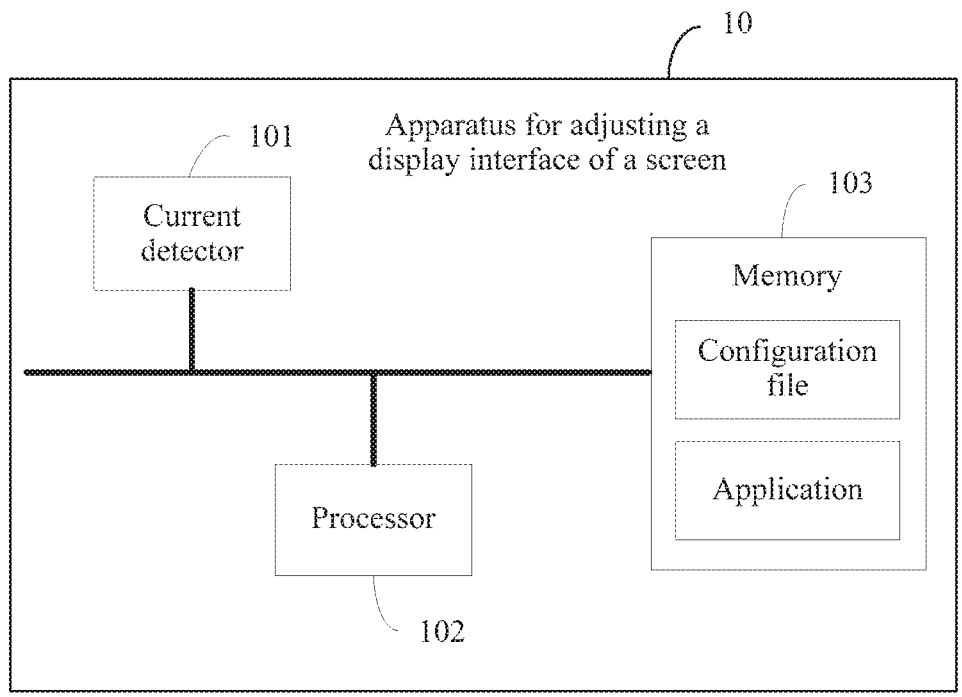
FIG. 1 is a schematic structural diagram of an apparatus for adjusting a display interface of a screen according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the field of the electronics displaying, a screen usually includes a plurality of pixels, and one pixel usually includes a red subpixel, a green subpixel, and a blue subpixel. For example, an image whose resolution is 1920×1080 includes 1920×1080 pixels. Light emitting materials of different pixels have different optical-to-electrical conversion efficiency. Optical-to-electrical conversion efficiency of a green-subpixel light emitting material is highest, that of a red-subpixel light emitting material is lower, and that of a blue-subpixel light emitting material is lowest. Therefore, in same luminance settings, power consumption of solid-color images of white, purple, cyan, blue, red, green, and black varies greatly. In any image, a proportion of a pixel quantity of each color in a total pixel quantity and a luminance level directly determine power consumption of a screen. That is, in same luminance settings, power consumption of the screen for displaying different images is different. Therefore, when a user uses an electronic device, a wallpaper selected for a display interface and an interface color style directly affect an energy consumption status of a screen, thereby affecting an overall standby time of the electronic device.

Based on this, a basic principle of the present disclosure is: using a feature that power consumption of a screen varies with a color of an image on a display interface of the screen, for example, power consumption of a screen such as an AMOLED, PMOLED, LED, or QLED screen, varies with a color of an image displayed on the screen. With same screen luminance, power consumption of the screen for displaying images of different colors is different. In the technical solutions of the present disclosure, a current value of a sampling point is obtained, whether power consumption of the electronic device meets a criterion is determined according to the current value; and if the power consumption does not meet the criterion, the display interface displayed on the screen is adjusted so as to optimize power consumption of the screen, thereby adjusting the power consumption of the electronic device. According to the solutions of the present disclosure, the power consumption of the screen can be adjusted without changing the luminance of the screen.

It may be understood that the solutions of the present disclosure can be implemented without changing the luminance of the screen, so as to ensure a value and a displaying effect of an image and user experience, or the solutions of the present disclosure can be implemented with the luminance of the screen changed. A specific implementation is not specifically limited in the present disclosure.

A method for adjusting a display interface of a screen provided in the embodiments of the present disclosure may be performed by an apparatus for adjusting a display interface of a screen. The screen displays the display interface, and the apparatus may be a part or a whole of an electronic device.

The electronic device may be a mobile phone, a tablet computer, a notebook computer, an ultra-mobile personal computer (Ultra-mobile Personal Computer, UMPC for short), a netbook, a personal digital assistant (Personal Digital Assistant, PDA for short), an ebook, a mobile television, a wearable device, or the like. FIG. 1 shows a schematic structural diagram of an apparatus for adjusting a display interface of a screen that is related to the embodiments of the present disclosure.

As shown in FIG. 1, the apparatus 10 for adjusting a display interface of a screen may include a current detector 101, a processor 102, and a memory 103.

In the following, each integral part of the apparatus 10 for adjusting a display interface of a screen is described in detail with reference to FIG. 1.

The current detector 101 is configured to detect a current value of a current sampling point.

Information such as a model of the current detector 101 is not specifically limited in this embodiment of the present disclosure, and any component that can detect a current may be used as the current detector 101.

The memory 103 may be a volatile memory (volatile memory), for example, a random access memory (random-access memory, RAM); or a nonvolatile memory (non-volatile memory), for example, a read-only memory (read-only memory, ROM), a flash memory (flash memory), a hard disk (hard disk drive, HDD), or a solid-state drive (solid-state drive, SSD); or a combination of the foregoing types of memories. The memory 103 may be configured to store a configuration file and a relevant application for implementing a method in the present disclosure.

The processor 102 is a control center of the apparatus 10 for adjusting a display interface of a screen, and may be a central processing unit (central processing unit, CPU for short), or may be an application-specific integrated circuit (Application Specific Integrated Circuit, ASIC for short), or one or more integrated circuits configured to implement this embodiment of the present disclosure, such as one or more microprocessors (digital signal processor, DSP for short) or one or more field programmable gate arrays (Field Programmable Gate Array, FPGA for short). The processor 102 may run or execute a software program and/or module stored in the memory 103, and invoke data stored in the memory 103, so as to perform various functions of the apparatus 10 for adjusting a display interface of a screen.

The processor 102 may be configured to determine, according to the current value obtained by the current detector 101, whether power consumption of the apparatus 10 meets a criterion.

It should be noted that the processor 102 may be a processor that is independently set in the apparatus 10 for adjusting a display interface of a screen, or may be a processor in an electronic device that includes the apparatus 10 for adjusting a display interface of a screen. This is not specifically limited in the present disclosure.

Further, the current detector 101 may be further configured to re-detect a current value of the current sampling point after the processor 102 adjusts the display interface, so that the processor 102 performs re-determining until the power consumption of the electronic device meets the criterion.

In the following, the embodiments of the present disclosure are described in detail with reference to the accompanying drawings.

Figure 2:
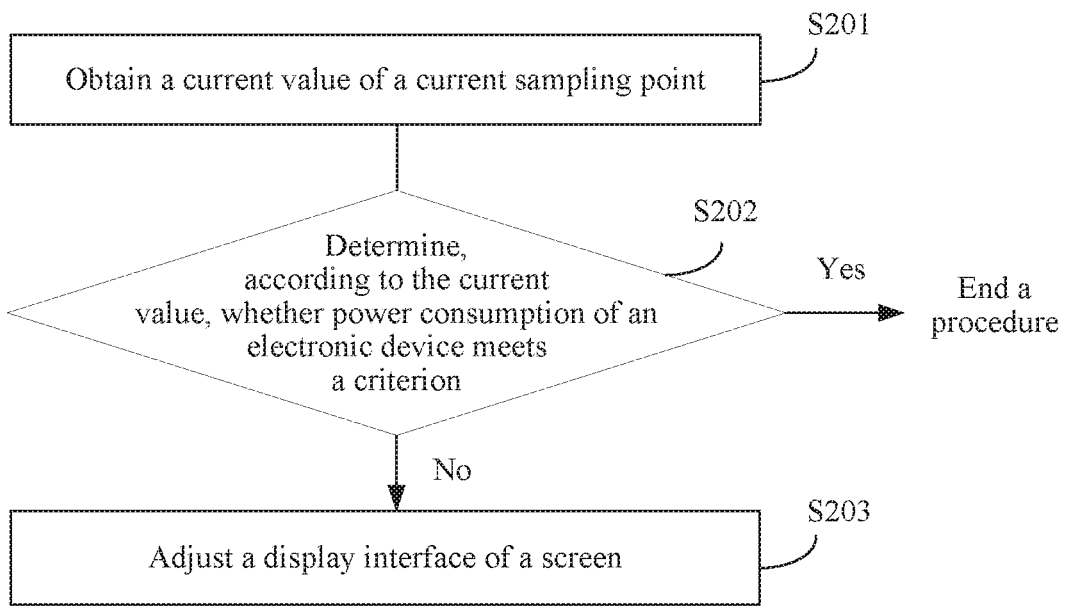
FIG. 2 is a flowchart of a method for adjusting a display interface of a screen according to an embodiment of the present disclosure.

FIG. 2 is a flowchart of a method for adjusting a display interface of a screen according to an embodiment of the present disclosure. The method is applied to an apparatus for adjusting a display interface of a screen. As shown in FIG. 2, the method for adjusting a display interface of a screen may include the following steps.

S201. Obtain a current value of a current sampling point.

A current at the current sampling point may directly or indirectly reflect power consumption of the screen.

Figure 3:
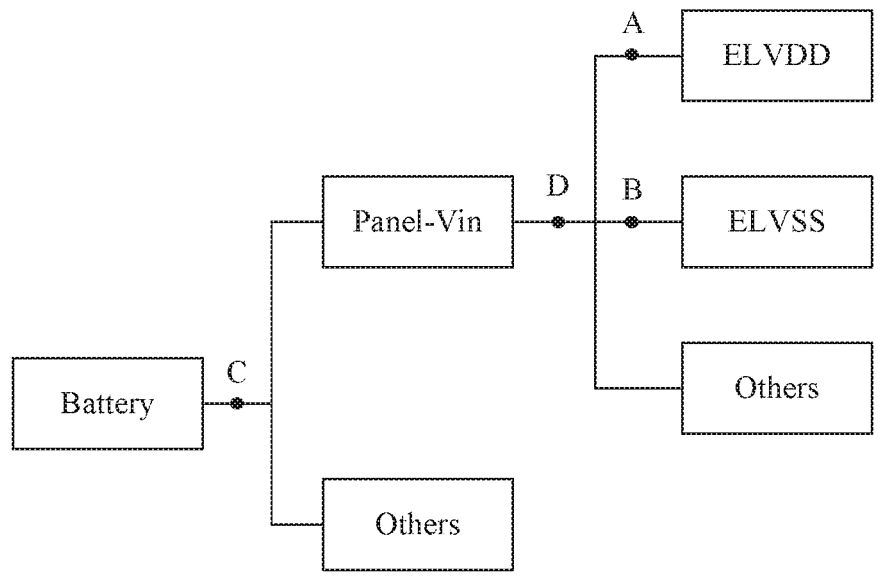
FIG. 3 is a schematic diagram of a power supply topology structure of an electronic device according to an embodiment of the present disclosure.

FIG. 3 shows a power supply topology structure of an electronic device. A battery is used as a power supply for the electronic device, and outputs a current to an input power supply Vin of a display panel and another component (the another component includes a CPU, a memory, a near field communication (Near Field Communication, NFC for short) device, an earphone, and another energy-consuming component); and the input power supply Vin inputs the current to the display panel, and the current is transmitted to each functional area of the panel after direct current-to-direct current conversion. An anode (ELVDD) and a cathode (ELVSS) of AMOLED or PMOLED screen are main energy consumption power supplies of the panel.

The current sampling point may be disposed at any one of A, B, C, or D in the power supply topology structure shown in FIG. 3, and is used to obtain the current value through sampling. Preferably, the current sampling point is at A and B, that is, current sampling points for obtaining the power consumption of the screen, in the power supply topology stricture shown in FIG. 3.

It should be noted that in an actual application, a specific location of the sampling point may be disposed according to a topology structure of an actual circuit and proportions of a current and power that are consumed by the screen in an overall current and power that are consumed by the electronic device. This can precisely reflect the current and power that are consumed by the screen and a change in power consumption. FIG. 3 is merely an example for describing disposition of the sampling point, and does not limit a specified location of the sampling point.

S202. Determine, according to the current value, whether power consumption of the electronic device meets a criterion.

Optionally, if the power consumption of the electronic device meets the criterion, a procedure is skipped, and the solution ends. When the power consumption of the electronic device does not meet the criterion, S203 is performed.

Content of the power consumption of the electronic device varies with a location of the sampling point in the power supply topology structure. Specifically, if the sampling point is at a location A, B, or D in FIG. 3, the obtained current value can directly reflect power consumption of the screen in the electronic device. If the sampling point is at a location C in FIG. 3, the obtained current value can directly reflect the overall power consumption of the electronic device, and indirectly reflect the power consumption of the screen in the electronic device.

Figure 4:
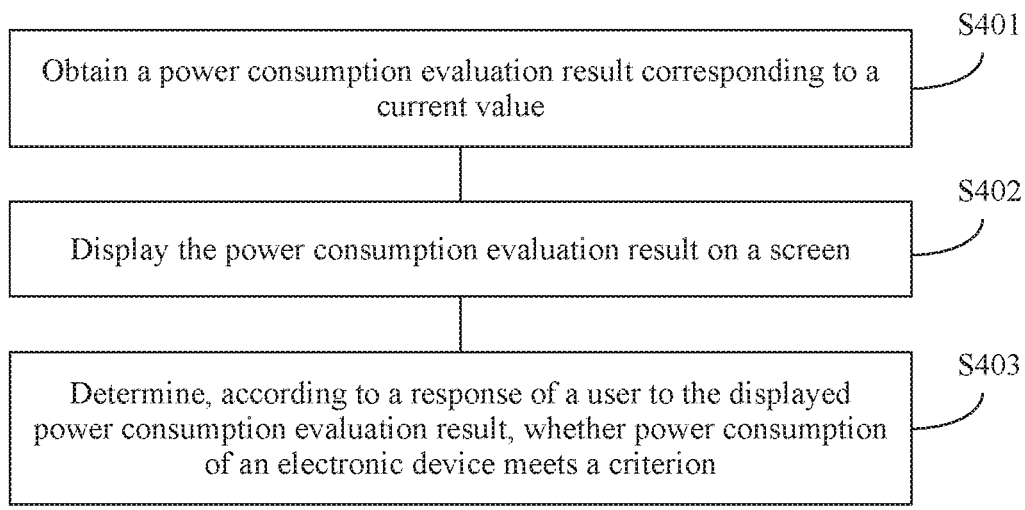
FIG. 4 is a flowchart of a method for determining whether power consumption of an electronic device meets a criterion according to an embodiment of the present disclosure.

Optionally, a process of determining, according to the current value, whether the power consumption of the electronic device meets the criterion may be implemented in at least one of the following three manners:

Manner 1:

As shown in FIG. 4, in Manner 1, the process of determining, according to the current value, whether the power consumption of the electronic device meets the criterion may include the following S401 to S403.

S401. Obtain a power consumption evaluation result corresponding to the current value.

The power consumption evaluation result corresponding to the current value may be a power consumption evaluation result corresponding to an interval including power consumption information. The power consumption information may be the current value and/or a power consumption value, and the power consumption value is a value obtained by multiplying the current value by a power supply voltage.

Specifically, the power consumption evaluation result corresponding to the current value may be obtained from a preset correspondence. The preset correspondence includes at least one preset current value and/or power consumption value interval and a power consumption evaluation result corresponding to the current value and/or power consumption value interval. The preset correspondence may be stored in the memory 103.

Optionally, the preset correspondence may be stored in a table form.

For example. Table 1 describes a preset correspondence.

TABLE 1

| Current interval | Power consumption level |
| --- | --- |
| C1 < Present current value ≤ Upper limit | ★ |
| C2 < Present current value ≤ C1 | ★★ |
| C3 < Present current value ≤ C2 | ★★★ |
| C4 < Present current value ≤ C3 | ★★★★ |
| Lower limit < Present current value ≤ C4 | ★★★★★ |

In the preset correspondence shown in Table 1, the power consumption information is a current interval, and the power consumption evaluation result is a power consumption level that corresponds one-to-one to the current interval. The current upper limit in Table 1 may be less than or equal to a largest screen current value in screen technology specifications, and the current lower limit in Table 1 may be greater than or equal to 0.

It should be noted that Table 1 describes only an example of content and a form of the preset correspondence, and does not specifically limit the content and the form of the preset correspondence.

In an actual application, alternatively, the preset correspondence may be stored in another form.

In an actual application, alternatively, the power consumption information interval in the present correspondence may be a power consumption interval, or may be a current interval and a power consumption interval. This is not specifically limited in this embodiment of the present disclosure.

In an actual application, in addition to the power consumption level described in Table 1, the power consumption evaluation result corresponding to the power consumption information interval in the preset correspondence may be one or more items of the following information: a power consumption score, an estimated remaining standby time, or the like. This is not specifically limited in the present disclosure.

It should be further noted that a specific form of the power consumption evaluation result may be determined according to an actual requirement. This is not limited in the present disclosure.

Further, when the power consumption evaluation result includes the power consumption score, the power consumption score may be obtained by using either of the following two implementations:

Implementation 1

A correspondence between a current value or a current interval and a power consumption score is preset in the preset correspondence, and a power consumption score corresponding to a current value may be obtained by querying the preset correspondence according to the current value.

Implementation 2: The power consumption score is obtained through calculation.

Optionally, the power consumption score is obtained as follows: Power consumption score=100−K×Power consumption information corresponding to a present current value÷Power consumption information upper limit.

K is a preset slope adjustment constant. In an actual application, K may be set according to an actual requirement.

Optionally, a value of K may be set for each power consumption information interval, and values of K of all power consumption information intervals may be the same or different.

For example, Table 2 describes a correspondence between a current interval and a power consumption score.

TABLE 2

| Current interval | Power consumption score |
| --- | --- |
| 230 mA < Present current value ≤ 300 mA | (50, 0] |
| 100 mA < Present current value ≤ 230 mA | (70, 50] |
| 60 mA < Present current value ≤ 100 mA | (80, 70] |
| 30 mA < Present current value ≤ 60 mA | (90, 80] |
| 0 mA < Present current value ≤ 30 mA | (100, 90] |

When a power consumption information upper limit is 300 mA, and preset current consumption is 300 mA, the power consumption score is 0; when the current consumption is 230 mA, the power consumption score is 50; when the current consumption is 100 mA, the power consumption score is 70; when the current consumption is 60 mA, the power consumption score is 80; and when the current consumption is 30 mA, the power consumption score is 90.

According to the equation: Power consumption score=100−K×Power consumption information corresponding to a present current value÷Power consumption information upper limit, and according to the correspondence between a current interval and a power consumption score, it may be learned that a value of K corresponding to each current interval is described in Table 3.

TABLE 3

| Current interval | Power consumption score | Value of K |
| --- | --- | --- |
| 230 mA < Present current value ≤ 300 mA | (50, 0] | 100 |
| 100 mA < Present current value ≤ 230 mA | (70, 50] | 100 |
| 60 mA < Present current value ≤ 100 mA | (80, 70] | 90 |
| 30 mA < Present current value ≤ 60 mA | (90, 80] | 65 |
| 0 mA < Present current value ≤ 30 mA | (100, 90] | 1 |

It should be noted that the foregoing calculation formula of the power consumption score is merely an optional implementation solution, and in an actual application, the calculation formula may be set according to an actual requirement. This is not specifically limited in the present disclosure.

It should be further noted that when the power consumption evaluation result includes the estimated remaining standby time, an implementation is similar to the foregoing implementations of obtaining the power consumption score. Details are not described separately herein.

It should be further noted that values and a quantity of the foregoing specific slop adjustment parameters K and those of current thresholds (C1, C2, C3, and C4) of each interval are subject to power consumption levels and score gradients that can distinguish between different colors. A specific value is not limited in this embodiment of the present disclosure.

S402. Display the power consumption evaluation result on a screen.

Specifically, the power consumption evaluation result may be displayed on a human-computer interaction interface of the electronic device that includes the screen.

Figure 5:
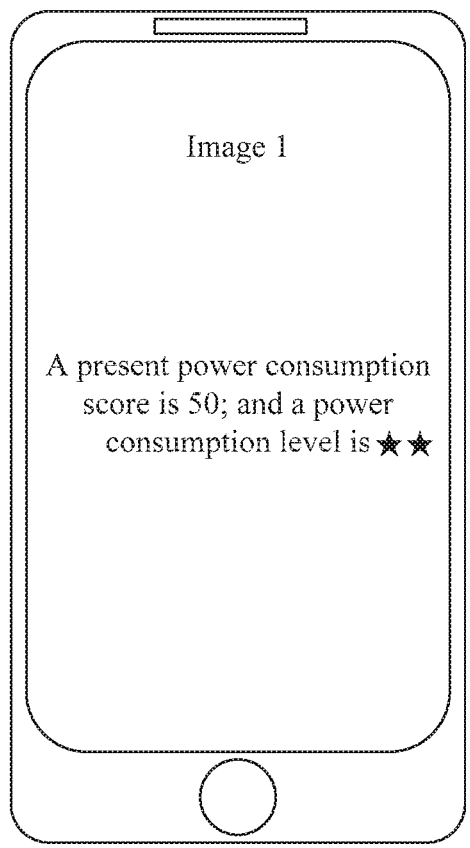
FIG. 5 is a schematic diagram of a first display interface according to an embodiment of the present disclosure.

For example, it is assumed that the power consumption evaluation result obtained by performing S401 is: The power consumption level is ★★, and the power consumption score is 50. As shown in FIG. 5, the screen of the electronic device may display the following content: The present power consumption score is 50, and the power consumption level is ★★.

S403. Determine, according to a response of a user to the displayed power consumption evaluation result, whether the power consumption of the electronic device meets the criterion.

Specifically, if an indication entered by the user for indicating that the power consumption evaluation result is satisfactory is received within preset duration, it is determined that the power consumption of the electronic device meets the criterion; or if an indication entered by the user for indicating that the power consumption evaluation result is satisfactory is not received within the preset duration, or if an indication entered by the user for indicating that the power consumption evaluation result is unsatisfactory is received within the preset duration, it is determined that the power consumption of the electronic device does not meet the criterion.

Optionally, the indication is an indication entered by the user when the user is satisfied with both the power consumption and image content, that is, the user considers that the display interface can meet requirements of the user on a displaying effect and power consumption.

The preset duration may be set according to an actual requirement, and this is not specifically limited in the present disclosure.

Manner 2:

A relationship between the current value and a first preset threshold is determined.

If the current value is greater than or equal to the first preset threshold, it is determined that the power consumption of the electronic device does not meet the criterion; or if the current value is less than the first preset threshold, it is determined that the power consumption of the electronic device meets the criterion.

A value of the first preset threshold may be set according to an actual requirement, and this is not limited in this embodiment of the present disclosure.

Manner 3:

A power consumption evaluation result corresponding to the current value is obtained.

If the power consumption evaluation result is greater than or equal to a second preset threshold, it is determined that the power consumption of the electronic device meets the criterion; or if the power consumption evaluation result is less than a second preset threshold, it is determined that the power consumption of the electronic device does not meet the criterion.

A value of the second preset threshold may be set according to an actual requirement, and this is not limited in this embodiment of the present disclosure.

It should be noted that, that the power consumption evaluation result is greater than or equal to the second preset threshold means that the power consumption evaluation result is better than the second preset threshold with respect to power consumption.

For example, it is assumed that the power consumption evaluation result is that the power consumption score is 85. If the second preset threshold is that the power consumption score is 70, the power consumption evaluation result is greater than the second preset threshold.

For example, it is assumed that the power consumption evaluation result is that the estimated standby time is 150 minutes. If the second preset threshold is that the estimated standby time is 100 minutes, the power consumption evaluation result is greater than the second preset threshold.

For example, it is assumed that the power consumption evaluation result is that the power consumption level is ★★★★. If the second preset threshold is that the power consumption level is ★★, the power consumption evaluation result is greater than the second preset threshold.

S203. Adjust a display interface of the screen.

Optionally, after S203, the foregoing S201 and S202 may be repeated until the power consumption of the electronic device meets the criterion.

Specifically, in S203, a specific implementation solution for adjusting the display interface is not specifically limited in the present disclosure. This embodiment of the present disclosure describes the following two solutions as examples, which do not constitute a limitation on an implementation of adjusting the display interface.

Solution 1:

A color of an image displayed on the display interface is changed.

In an implementation, when the display interface is a first wallpaper, the display interface is adjusted to a second wallpaper. The second wallpaper is any wallpaper that is in a preset wallpaper library and whose power consumption is less than that of the first wallpaper or the second wallpaper is any wallpaper that is in the preset wallpaper library and that is different from the first wallpaper.

Optionally, a power consumption value of each wallpaper and/or a power consumption value relationship between wallpapers may be preset in the preset wallpaper library.

In another implementation, a color of a background of an image displayed on the display interface is changed; or a color of text displayed on the display interface is changed; or a color of an image displayed on the display interface is changed.

The color of the image displayed on the display interface may be changed automatically, that is, the color of the image displayed on the display interface may be changed automatically with reference to ambient light luminance, so that the color of the displayed image ensures visual experience of human eyes.

The color of the image displayed on the display interface may be changed manually by the user.

A specific implementation for changing the color of the image displayed on the display interface is not limited in the present disclosure.

Solution 2

An indication entered by the user for changing a color of a first region is received; and the color of the first region is changed into a color indicated by the indication. The first region is any region on the display interface.

Optionally, in the foregoing Solution 2, prompt information may be further displayed on the display interface. The prompt information is used to prompt the user about modification that is beneficial to power consumption reduction.

According to the method for adjusting a display interface of a screen provided in this embodiment of the present disclosure, the current value of the current sampling point is obtained; whether the power consumption of the electronic device meets the criterion is determined according to the current value; and the display interface is adjusted when the power consumption of the electronic device does not meet the criterion. Light emitting materials of different pixels have different optical-to-electrical conversion efficiency. Therefore, according to the solutions of the present disclosure, the display interface of the screen can be adjusted, so as to adjust the power consumption of the screen without lowering a luminance level of the screen.

In the following, a specific example is used to describe the method for adjusting a display interface of a screen shown in FIG. 2.

For example, the power consumption information is the current value. It is assumed that the preset correspondence is described in Table 4.

TABLE 4

| Current interval | Power consumption level | Slop adjustment constant K |
|---|---|---|
| 230 mA < Present current value ≤ 300 mA | ★ | 100 |
| 100 mA < Present current value ≤ 230 mA | ★★ | 100 |
| 60 mA < Present current value ≤ 100 mA | ★★★ | 90 |
| 30 mA < Present current value ≤ 60 mA | ★★★★ | 65 |
| 0 mA < Present current value ≤ 30 mA | ★★★★★ | 1 |

EXAMPLE 1

It is assumed that a user taps to enable an APP, to trigger a procedure of the present disclosure, and an execution process is as follows:

For example, the display interface is a wallpaper 1, an obtained present current value of a sampling point is 180 mA, an interval that includes the present current value and that is obtained from a preset correspondence is 100 mA to 230 mA, and a corresponding power consumption level is ★★.

A power consumption score obtained through calculation is: (100−100×180)÷300=40.

Figure 6:
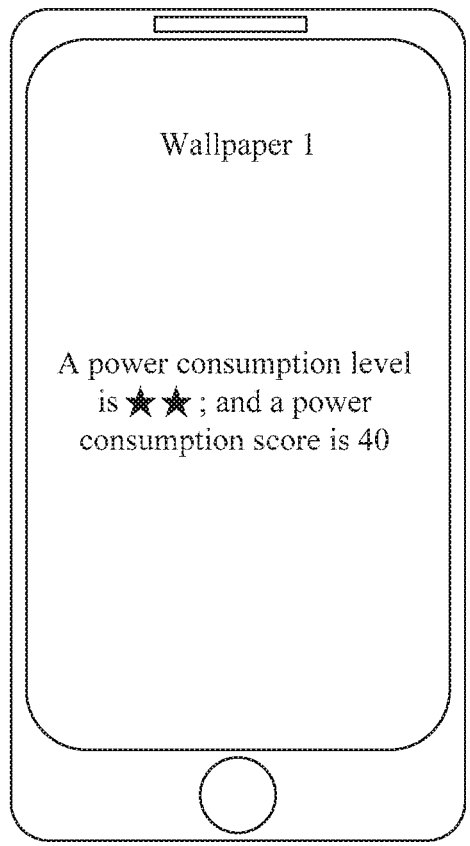
FIG. 6 is a schematic diagram of a second display interface according to an embodiment of the present disclosure.

As shown in FIG. 6, a power consumption evaluation result of the wallpaper 1 is: The power consumption level is ★★, and the power consumption score is 40. The power consumption evaluation result is displayed by using the screen.

If an indication entered by the user for indicating that the power consumption evaluation result is satisfactory is not received within preset duration, the display interface is adjusted to a wallpaper 2, and a present current value of the sampling point is re-obtained. It is assumed that the value is 60 mA.

An interval that includes the present current value and that is obtained from the preset correspondence is 30 mA to 60 mA, and a corresponding power consumption level is ★★★★. A power consumption score obtained through calculation is: (100−100×60)÷300=80.

Figure 7:
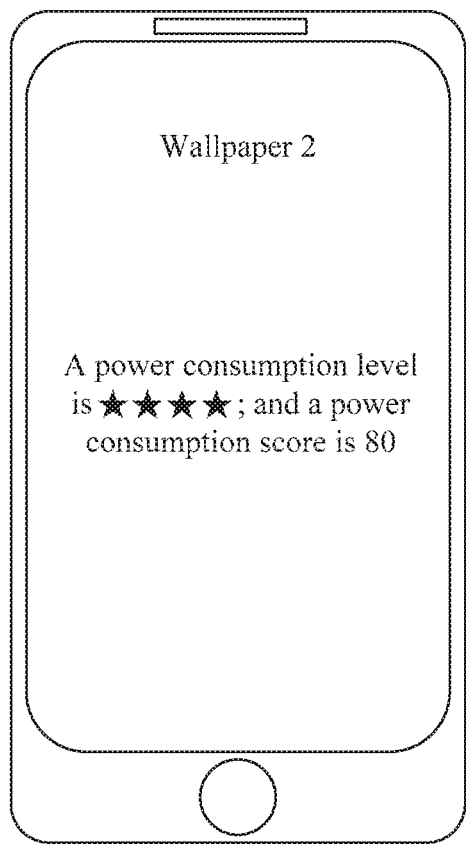
FIG. 7 is a schematic diagram of a third display interface according to an embodiment of the present disclosure.

As shown in FIG. 7, a power consumption evaluation result of the wallpaper 2 is: The power consumption level is ★★★★, and the power consumption score is 80. The power consumption evaluation result is displayed by using the screen. If an indication entered by the user for indicating that the power consumption evaluation result is satisfactory is received within the preset duration, the procedure ends.

EXAMPLE 2

Figure 8:
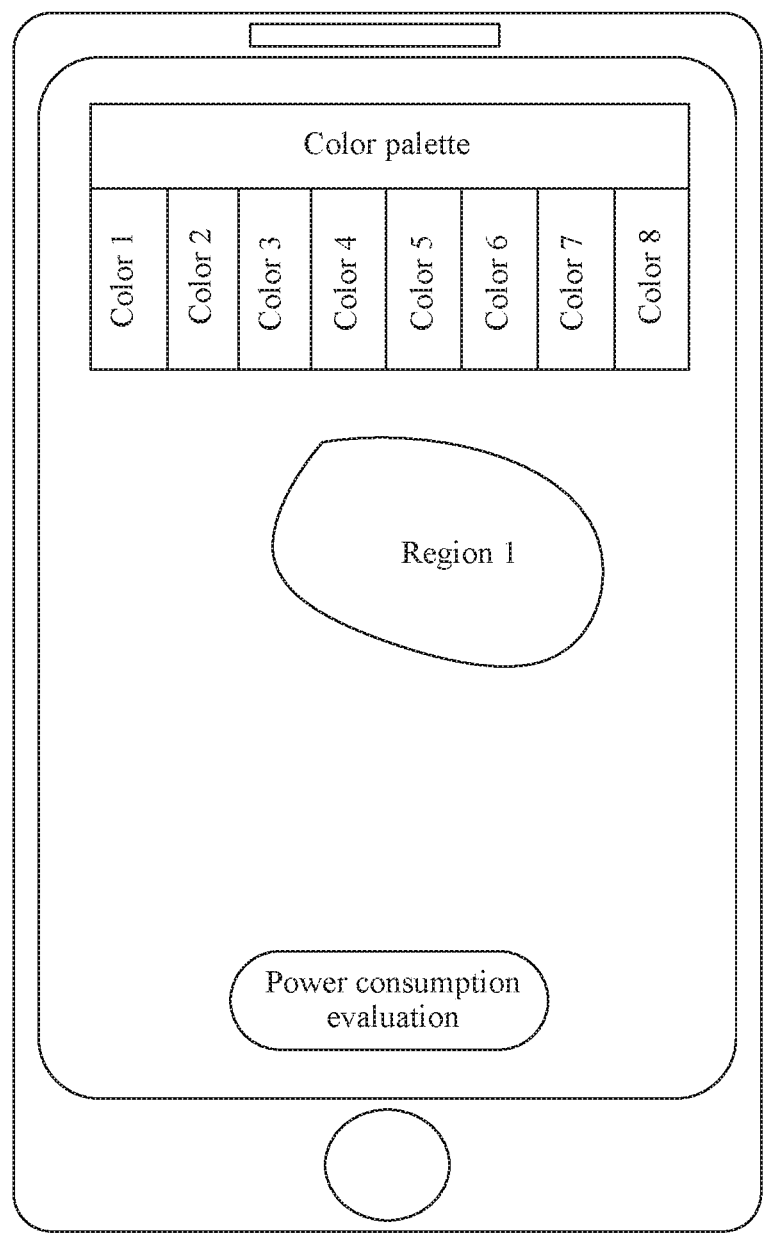
FIG. 8 is a schematic diagram of a fourth display interface according to an embodiment of the present disclosure.

As shown in FIG. 8, a user taps and holds a region 1 (the region 1 may be a region whose color is unsatisfactory to the user) the display interface to change the color of the region 1, and selects a color 1 from a color palette to change the color of the region 1 into the color 1. In addition, the user taps a "power consumption evaluation" button on the interface shown in FIG. 8 to trigger the procedure in the present disclosure, and execution is as follows:

An obtained present current value of a sampling point is 100 mA, an interval that includes the present current value and that is obtained by searching a preset correspondence is 60 mA to 100 mA, and a corresponding power consumption level is ★★★.

A power consumption score obtained through calculation is: 100−100×100÷300=70.

Figure 9:
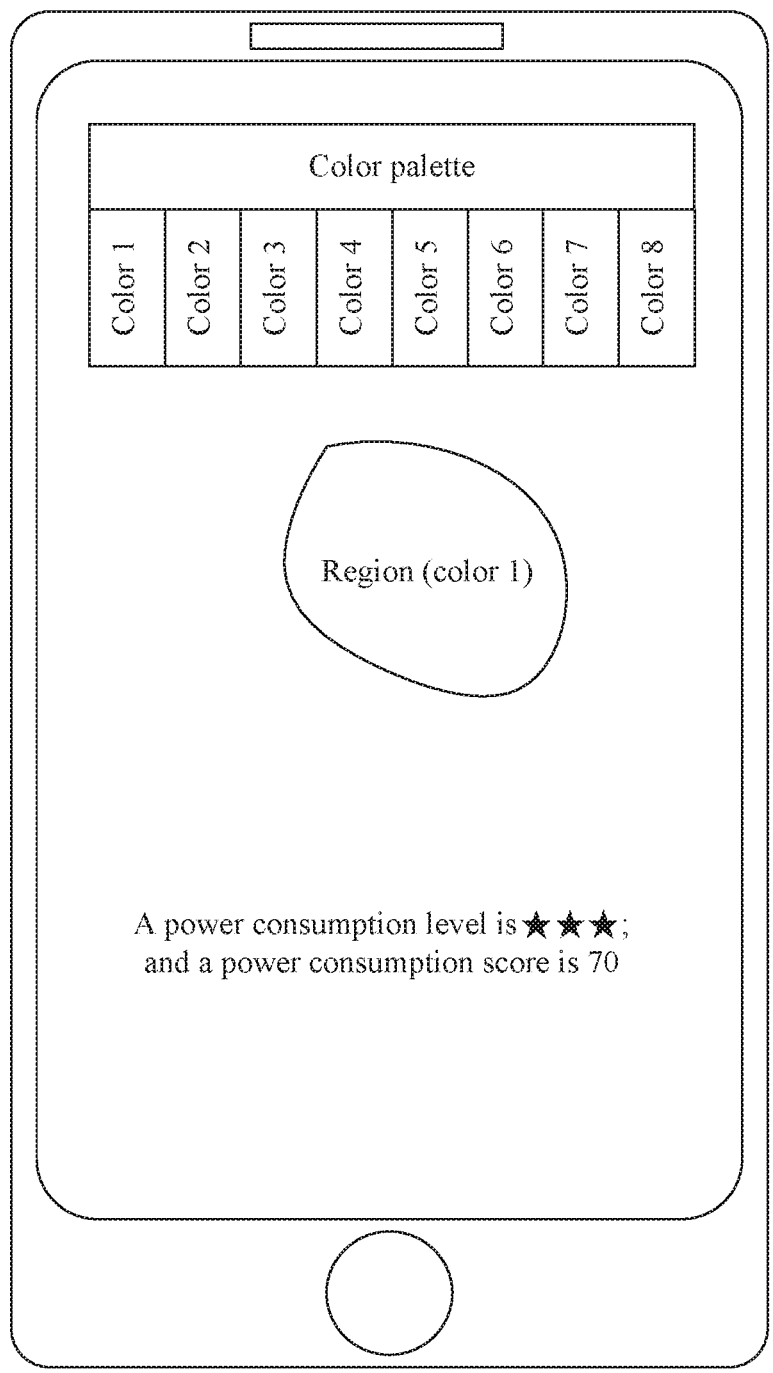
FIG. 9 is a schematic diagram of a fifth display interface according to an embodiment of the present disclosure.

As shown in FIG. 9, a power consumption evaluation result obtained after the display interface is adjusted this time is: The power consumption level is ★★★; and the power consumption score is 70. The power consumption evaluation result is displayed by using the screen.

Further, according to preset power consumption of each color, it may be learned that power consumption of the screen for displaying a color 4 is less than power consumption of the screen for displaying the color 1. In addition to displaying the power consumption evaluation result, the screen further displays indication information indicating that the user may adjust the color 1 of the first region to the color 4 for further power consumption reduction of the screen.

It is assumed that an indication entered by the user for indicating that the power consumption evaluation result is satisfactory is not received within preset duration, and it is detected that the user taps and holds the region 1 on the interface to change the color of the region 1, and selects the color 4 from the color palette to change the color of the region 1 into the color 4. A present current value of the sampling point is re-obtained, and it is assumed that the value is 30 mA.

An interval that includes the present current value and that is obtained from the preset correspondence is 0 mA to 30 mA, and a corresponding power consumption level is ★★★★★.

A power consumption score obtained through calculation is: 100−100×30÷300=90.

Figure 10:
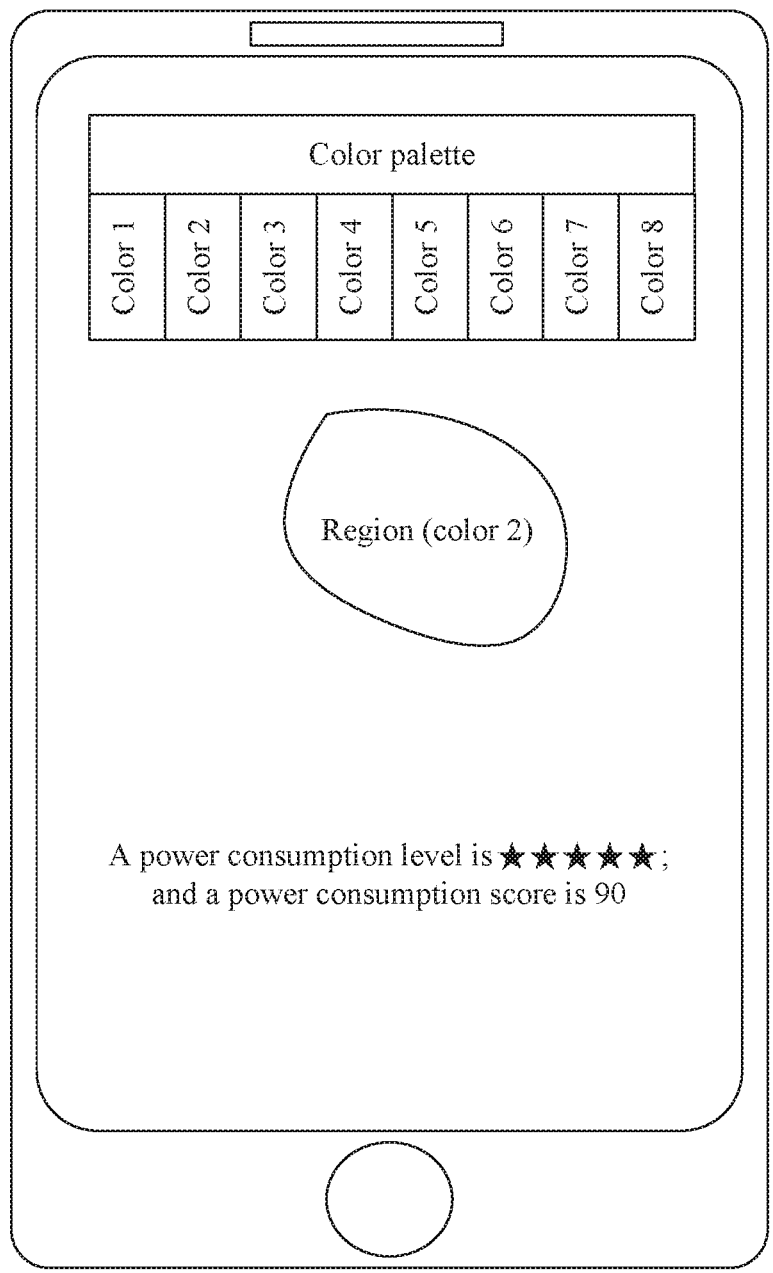
FIG. 10 is a schematic diagram of a sixth display interface according to an embodiment of the present disclosure.

As shown in FIG. 10, a power consumption evaluation result obtained after the display interface is adjusted this time is: The power consumption level is ★★★★★, and the power consumption score is 90. The power consumption evaluation result is displayed by using the screen.

If an indication entered by the user for indicating that the power consumption evaluation result is satisfactory is received within the preset duration, the procedure ends.

It should be noted that the foregoing description is merely two examples for briefly describing the execution process in the present disclosure. In an actual application, the display interface may be adjusted for a plurality of times, so as to adjust the power consumption of the screen.

Figure 11:
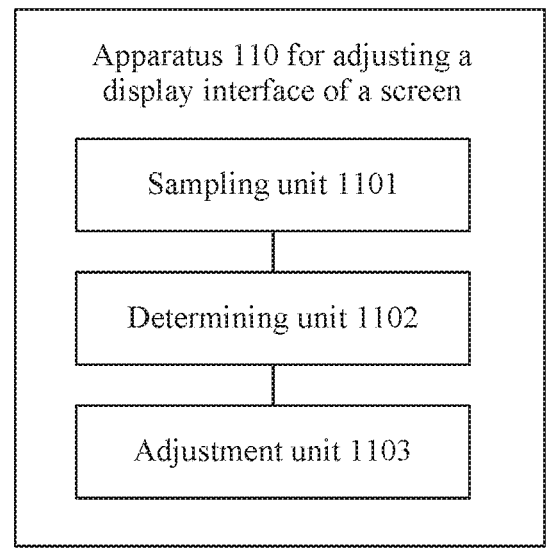
FIG. 11 is a schematic structural diagram of another apparatus for adjusting a display interface of a screen according to an embodiment of the present disclosure.

An embodiment of the present disclosure further provides an apparatus 110 for adjusting a display interface of a screen. Referring to FIG. 11, the apparatus 110 for adjusting a display interface of a screen may include:

a sampling unit 1101, configured to obtain a current value of a current sampling point;

a determining unit 1102, configured to determine, according to the current value obtained by the sampling unit 1101, whether power consumption of the apparatus 110 meets a criterion; and an adjustment unit 1103, configured to adjust the display interface when the determining unit 1102 determines that the power consumption of the apparatus 110 does not meet the criterion.

Further, the sampling unit 1101 is further configured to re-obtain a current value of the current sampling point after the adjustment unit 1103 adjusts the display interface.

Further, the determining unit 1102 may be specifically configured to:

obtain a power consumption evaluation result corresponding to the current value;

display the power consumption evaluation result on the screen; and if an indication entered by a user for indicating that the power consumption evaluation result is satisfactory is received within preset duration, determine that the power consumption of the apparatus meets the criterion; or if an indication entered by a user for indicating that the power consumption evaluation result is satisfactory is not received within the preset duration, or if an indication entered by a user for indicating that the power consumption evaluation result is unsatisfactory is received within the preset duration, determine that the power consumption of the apparatus does not meet the criterion.

Further, the determining unit 1102 may be specifically configured to:

determine a relationship between the current value and a first preset threshold; and if the current value is greater than or equal to the first preset threshold, determine that the power consumption of the apparatus does not meet the criterion; or if the current value is less than the first preset threshold, determine that the power consumption of the apparatus meets the criterion.

Further, the determining unit 1102 may be specifically configured to:

obtain a power consumption evaluation result corresponding to the current value;

if the power consumption evaluation result is greater than or equal to a second preset threshold, determine that the power consumption of the apparatus meets the criterion; or if the power consumption evaluation result is less than the second preset threshold, determine that the power consumption of the apparatus does not meet the criterion.

Optionally, the adjustment unit 1103 may be specifically configured to adjust a color of the display interface.

Optionally, the adjustment unit 1103 may be specifically configured to:

if the display interface is a first wallpaper, adjust the display interface to a second wallpaper, where the second wallpaper is any wallpaper that is in a preset wallpaper library and whose power consumption is less than that of the first wallpaper, or the second wallpaper is any wallpaper that is in the preset wallpaper library and that is different from the first wallpaper.

Optionally, the adjustment unit 1103 may be specifically configured to:

receive an indication entered by the user for changing a color of a first region; and change the color of the first region into a color indicated by the indication for changing the color of the first region, where the first region is any region on the display interface.

According to the apparatus 110 for adjusting a display interface of a screen provided in this embodiment of the present disclosure, the current value of the current sampling point is obtained; whether the power consumption of the electronic device meets the criterion is determined according to the current value; and the display interface is adjusted when the power consumption of the electronic device does not meet the criterion. Light emitting materials of different pixels have different optical-to-electrical conversion efficiency. Therefore, according to the solutions of the present disclosure, the display interface of the screen can be adjusted, so that the power consumption of the screen can be adjusted without lowering a luminance level of the screen.

Figure 12:
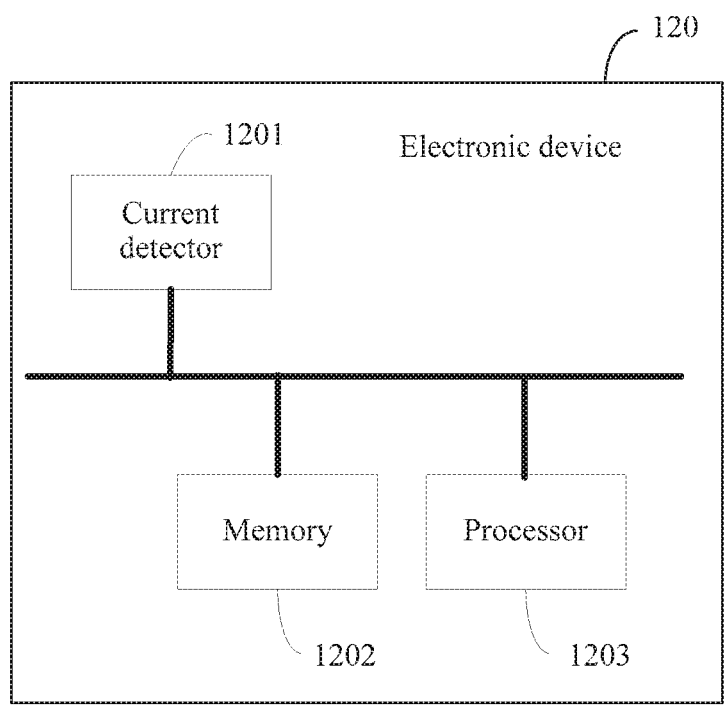
FIG. 12 is a schematic structural diagram of an electronic device according to an embodiment of the present disclosure.

Optionally, the apparatus 110 for adjusting a display interface of a screen may be an electronic device 120, so as to implement the method described in the foregoing FIG. 2. Referring to FIG. 12, FIG. 12 is a schematic structural diagram of the electronic device 120 according to an embodiment of the present disclosure. The electronic device 120 may include:

a current detector 1201, configured to obtain a current value of a current sampling point;

a memory 1202, configured to store an instruction; and a processor 1203, where the processor invokes an instruction stored in the memory 1201 to:

determine, according to the current value obtained by the current detector 1201, whether power consumption of the electronic device 120 meets a criterion; and adjust the display interface when the power consumption of the electronic device does not meet the criterion.

The electronic device 120 provided in this embodiment of the present disclosure is configured to perform the foregoing method for adjusting a display interface of a screen, to achieve an effect same as that in the foregoing method for adjusting a display interface of a screen.

Optionally, an embodiment of the present disclosure provides a non-volatile computer readable storage medium for storing one or more programs. The one or more programs include an instruction, and when being executed by an electronic device that includes a screen, the instruction enables the electronic device to execute the following event:

obtaining a current value of a current sampling point;

determining, according to the current value, whether power consumption of the electronic device meets a criterion; and adjusting the display interface when the power consumption of the electronic device does not meet the criterion.

Functional units of the apparatus for adjusting a display interface of a screen in the embodiments of the present disclosure may be integrated into one unit, or may be each independent physical unit, or two or more units may be integrated into one unit. In addition, the units may be implemented in a form of hardware, or may be implemented in a form of hardware in addition to a software functional unit.

An embodiment of the present disclosure further provides a user interface of an electronic device. The electronic device includes a display, a memory, a current detector, and a processor that is configured to execute an instruction stored in the memory. The user interface includes a display interface displayed in any of the foregoing embodiments.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (Read Only Memory, ROM for short), a random access memory (Random Access Memory, RAM for short), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method applied to an electronic device with a screen, wherein the screen displays a display interface, and the method comprises:

obtaining a current value of a current sampling point, wherein the current sampling point is selected based on a topology structure of a circuit of the electronic device;

determining, based on the current value, whether power consumption of the electronic device meets a criterion, wherein determining, based on the current value, whether power consumption of the electronic device meets a criterion comprises:

obtaining a power consumption evaluation result corresponding to the current value;

displaying the power consumption evaluation result on the screen; and determining that the power consumption of the electronic device does not meet the criterion when, within a preset duration, a first indication is not received from a user of the electronic device, wherein the first indication indicates that the power consumption evaluation result is satisfactory; and adjusting the display interface in response to determining that the power consumption of the electronic device does not meet the criterion when, within the preset duration, the first indication is not received from the user of the electronic device, wherein adjusting the display interface comprises:
receiving, from the user of the electronic device, a second indication associated with changing a current color of a first region on the display interface; and
changing the current color of the first region to a second color indicated by the second indication, wherein the first region is a region on the display interface, and wherein the second color indicated by the second indication is different from the current color of the first region.

2. The method of claim 1, wherein determining, based on the current value, whether power consumption of the electronic device meets a criterion further comprises:
determining that the power consumption of the electronic device meets the criterion when an indication entered by the user of the electronic device indicating that the power consumption evaluation result is satisfactory is received within the preset duration.

3. An electronic device with a screen, wherein the screen displays a display interface, and the electronic device comprising:
a current detector, the current detector configured to obtain a current value of a current sampling point, wherein the current sampling point is selected based on a topology structure of a circuit of the electronic device;
a memory, configured to store an instruction; and
at least one processor;
wherein the instruction instructs the at least one processor to:
determine, based on the current value obtained by the current detector, whether power consumption of the electronic device meets a criterion, wherein determine, based on the current value, whether power consumption of the electronic device meets a criterion comprises:
obtain a power consumption evaluation result corresponding to the current value;
display the power consumption evaluation result on the screen; and
determine that the power consumption of the electronic device does not meet the criterion when, within a preset duration, a first indication is not received from a user of the electronic device, wherein the first indication indicates that the power consumption evaluation result is satisfactory; and
adjust the display interface in response to determining that the power consumption of the electronic device does not meet the criterion when, within the preset duration, the first indication is not received from the user of the electronic device, wherein adjust the display interface comprises:
receive, from the user of the electronic device, a second indication associated with changing a current color of a first region on the display interface; and
change the current color of the first region to a second color indicated by the second indication, wherein the first region is a region on the display interface, and wherein the second color indicated by the second indication is different from the current color of the first region.

4. The electronic device of claim 3, wherein determine, based on the current value obtained by the current detector, whether power consumption of the electronic device meets a criterion, further comprises:
determine that the power consumption of the electronic device meets the criterion when an indication entered by the user of the electronic device indicating that the power consumption evaluation result is satisfactory is received within the preset duration.

5. A non-transitory computer readable storage medium comprising instructions which, when executed by an electronic device that comprises a screen, wherein the screen displays a display interface, cause the electronic device to perform operations of:
obtaining a current value of a current sampling point, wherein the current sampling point is selected based on a topology structure of a circuit of the electronic device;
determining, based on the current value, whether power consumption of the electronic device meets a criterion, wherein determining, based on the current value, whether power consumption of the electronic device meets a criterion comprises:
obtaining a power consumption evaluation result corresponding to the current value;
displaying the power consumption evaluation result on the screen; and
determining that the power consumption of the electronic device does not meet the criterion when, within a preset duration, a first indication is not received from a user of the electronic device, wherein the first indication indicates that the power consumption evaluation result is satisfactory; and
adjusting the display interface in response to determining that the power consumption of the electronic device does not meet the criterion when, within the preset duration, the first indication is not received from the user of the electronic device, wherein adjusting the display interface comprises:
receiving, from the user of the electronic device, a second indication associated with changing a current color of a first region on the display interface; and
changing the current color of the first region to a second color indicated by the second indication, wherein the first region is a region on the display interface, and wherein the second color indicated by the second indication is different from the current color of the first region.

6. The non-transitory computer readable storage medium of claim 5, wherein determining, based on the current value, whether power consumption of the electronic device meets a criterion further comprises:
determining that the power consumption of the electronic device meets the criterion when an indication entered by the user of the electronic device indicating that the power consumption evaluation result is satisfactory is received within the preset duration.

* * * * *